United States Patent [19]

Komooka et al.

[11] Patent Number: 5,285,296
[45] Date of Patent: Feb. 8, 1994

[54] CONVERSION OF COLOR DISPLAY DATA TO COLOR PRINT DATA

[75] Inventors: Haruo Komooka, Fujisawa; Toshifumi Matsuyama; Masao Mizuno, both of Yokohama, all of Japan

[73] Assignee: International Business Machines Corp., Armonk, N.Y.

[21] Appl. No.: 776,116

[22] Filed: Oct. 15, 1991

[30] Foreign Application Priority Data

Oct. 15, 1990 [JP] Japan .................................. 2-273508

[51] Int. Cl.⁵ .......................... H04N 1/46; G06F 15/72
[52] U.S. Cl. .................................... 358/518; 358/523; 358/538; 395/109

[58] Field of Search ................. 358/75, 448, 452, 453, 358/455, 456, 462, 464, 96, 518, 523, 537, 538, 530; 395/109

[56] References Cited

U.S. PATENT DOCUMENTS 4,992,955  2/1991  Yabuuchi et al. ................... 358/456
5,111,533  5/1992  Sekine et al. ....................... 395/109
5,123,083  6/1992  Shimomura ........................ 395/109

Primary Examiner—Edward L. Coles, Sr.
Assistant Examiner—Scott A. Rogers
Attorney, Agent, or Firm—Martin J. McKinley

[57] ABSTRACT

An image processor converts white areas displayable on a video display screen to white areas outlined in black and suitable for printing on white paper. In addition, black areas that are displayed on a video screen are converted to white for printing on white paper.

8 Claims, 4 Drawing Sheets

FIG. 2

| R | R | R | R | R | - | - | row (n-1) |
| - | - | G | G | G | - | - | row (n-1) |
| - | - | B | B | B | B | B | row (n-1) |

| R | R | R | R | R | - | - | row n |
| - | G | G | G | G | - | - | row n |
| - | B | B | B | B | B | B | row n |

| R | R | R | R | R | - | - | row (n+1) |
| - | - | G | G | G | - | - | row (n+1) |
| - | - | B | B | B | B | B | row (n+1) |

FIG. 3

| 0 | 0 | 1 | 1 | 1 | 0 | 0 | row (n-1) |
| 0 | 1 | 1 | 1 | 1 | 0 | 0 | row n |
| 0 | 0 | 1 | 1 | 1 | 0 | 0 | row (n+1) |

FIG. 4

| 0 | 0 | 1 | 1 | 1 | 0 | 0 | Both upper and lower, and itself white, row n |
| 1 | 1 | 0 | 0 | 0 | 1 | 1 | Reversed, row n |

FIG. 5

| 1 | 0 | 0 | 0 | 0 | 1 | 1 | Reversed white, row n |
| 0 | 1 | 0 | 0 | 0 | 0 | 1 | Shift right, row n |
| 0 | 0 | 0 | 0 | 1 | 1 | 0 | Shift left, row n |

FIG. 6

| 1 | 1 | 0 | 0 | 1 | 1 | 1 | White outline part and information other than white area, row n |

FIG. 7

| R | R | R | R | R | - | - | R row n |
| - | G | G | G | G | - | - | G row n |
| - | B | B | B | B | B | B | B row n |

FIG. 8

| R | R | - | - | R | - | - | Logical product to R, row n |
| - | G | - | - | G | - | - | Logical product to G, row n |
| - | B | - | - | B | B | B | Logical product to B, row n |

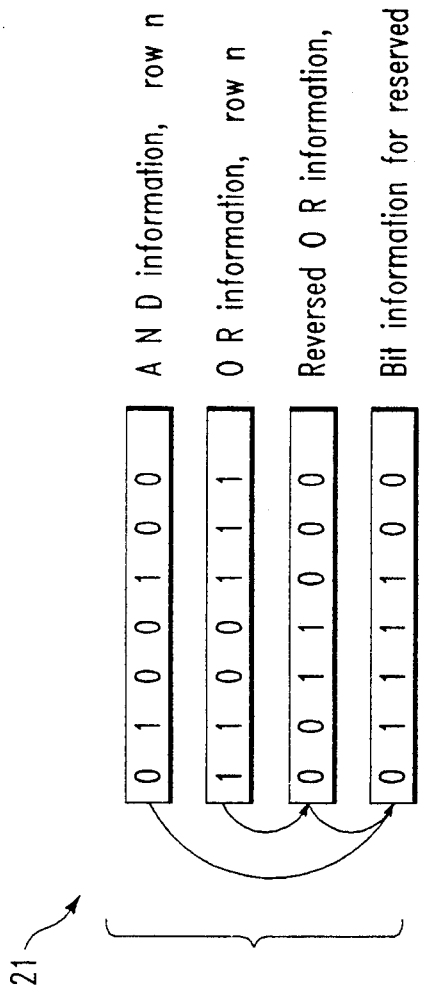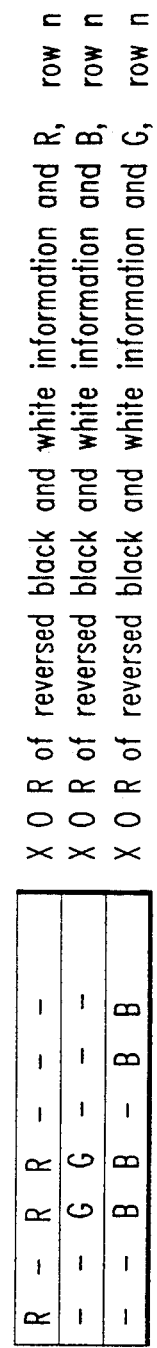
FIG. 9
FIG. 10
FIG. 11

Present invention

Image on color display screen

CONVERSION OF COLOR DISPLAY DATA TO COLOR PRINT DATA

BACKGROUND of the INVENTION

This invention pertains to an apparatus and method for converting color image data for display on a display screen to color image data for printing on a color printer. This application claims the foreign priority benefits of Japanese Application No. 2-273508 which was filed on Oct. 15, 1990. This Japanese application and its translation are wholly incorporated by reference herein.

The background color for a color display screen is usually selected such that it will contrast with the color or colors of the image to be displayed on the screen. When that same image is printed on a color printer, however, the shape of the image may be ill defined if the color of the paper is used as the background, and one of the colors of the image is substantially identical to the color of the paper. This is particularly true if an area at the boundary of the image is substantially identical to the color of the paper.

It is well known to print an image and its background exactly as they appear on a display screen, such that a black background on the screen prints out as a black background on the paper. However, if the background is not printed such that the background takes on the same color as the paper, the printed image usually creates a similar, but different impression as the same image displayed on the screen.

It is also well known to print white areas on a display screen as black areas on the paper, and to not print a black area on display screen. Thus, when using white paper, the image on the display screen is inverted, such that black prints out as white, and white prints out as black. In this method, however, a white image, such as the white bird of FIG. 13, is printed as a black bird on the paper. Thus, this method results in a printed image that differs substantially from the image that's displayed on the screen.

Accordingly, the invention described below provides a means for converting image data representing a white area on the screen (or other color that's the same color as the printer paper) into image data for printing an outline of the white area.

BRIEF DESCRIPTION OF THE DRAWINGS

FIGS. 2–10 are block diagrams showing memory areas in the RAM of the preferred embodiment of FIG. 1.

FIG. 11 is a block diagram showing a buffer for printed output in the RAM of the preferred embodiment of FIG. 1.

DESCRIPTION OF THE PREFERRED EMBODIMENT

Figure 1:
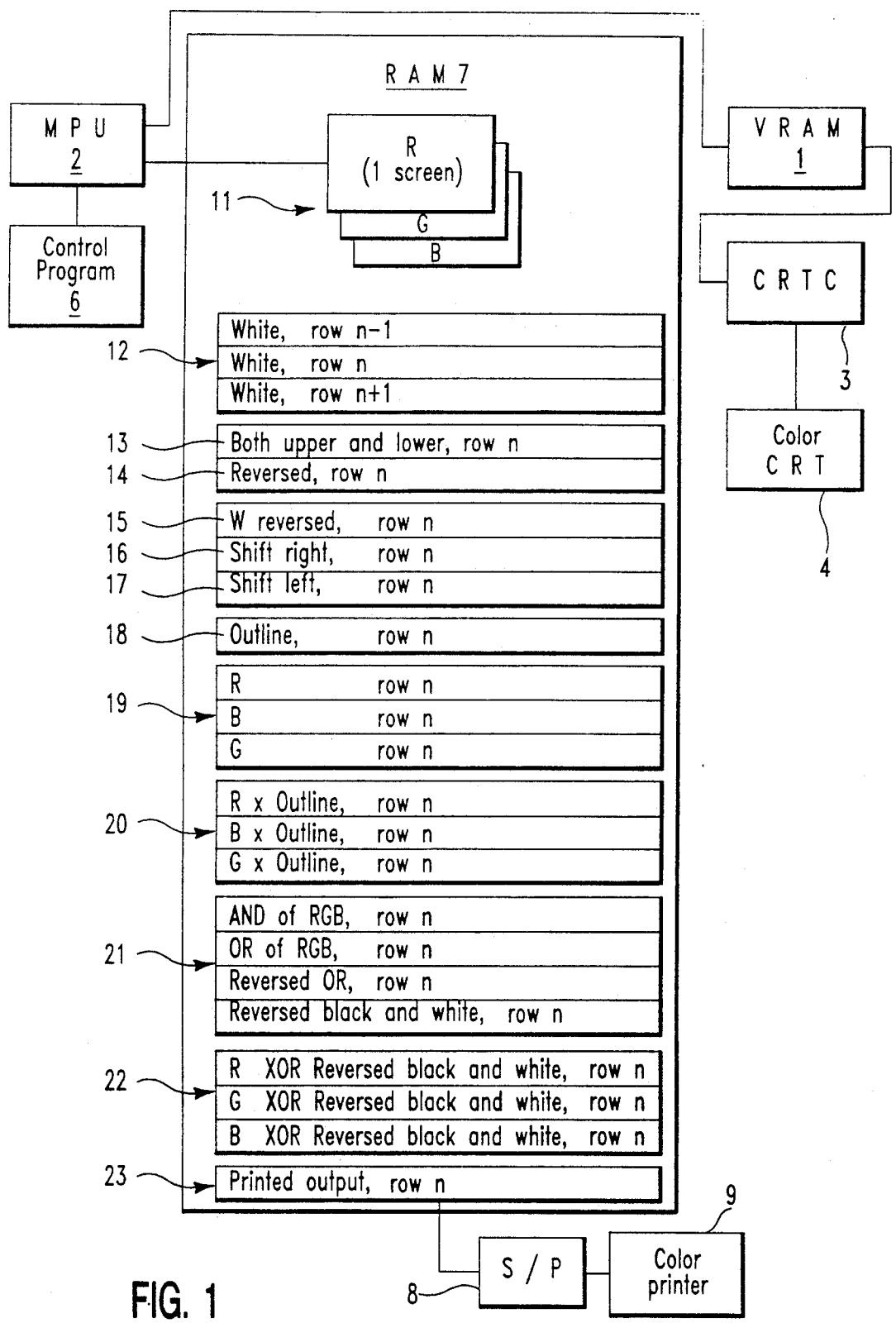
FIG. 1 is a block diagram of the preferred embodiment of an information processing apparatus constructed in accordance with the present invention.

FIG. 1 shows an embodiment of an image processing apparatus according to the present information. Referring to this figure, a Video RAM or VRAM 1 stores data corresponding to one complete screen of data on a color display screen. The contents of the VRAM 1 is rewritten by a Microprocessor Unit or MPU 2 and read out by a CRT Controller or CRTC 3 to produce a color image on the color display screen of a color display 4. The MPU 2 functions under a control program 6 and converts data for the color display screen in the VRAM 1 into data for color printing, using various memory areas in the RAM 7. The converted data is outputted, through a serial-to-parallel converter 8, to a color printer 9.

A complete screen of color data is stored in a first memory area 11 of the RAM 7. The information stored in this first memory area 11 consists of data that represents the three primary colors; specifically, red, green and blue (R, G and B, respectively). FIG. 2 illustrates a portion of the first memory area 11 in which storage areas for display row "n" and the two adjacent display rows "n−1" and "n+1" are shown. Each storage area for each row includes separate areas for storing the three primary colors for that row.

FIG. 3 illustrates the second memory area 12 in which three rows of "white pixel data" are stored. The white pixel data is computed for each pixel of each display row by logically AND'ing the R, G and B bits for that pixel, i.e., logically AND'ing the corresponding R, G and B data that's stored in the first memory area 11. The result of this logical operation is stored in the corresponding location in the second memory area 12. Thus, if a bit in the second memory area is set to a logical 1, then the pixel that corresponds to that bit is white.

FIG. 4 illustrates the third and fourth memory areas 13 and 14, respectively. "White column data" is stored in the third memory area 13, while the inverse of that data is stored in memory area 14. The white column data is computed for each pixel by logically AND'ing the white pixel data (as stored in memory area 12) for a selected pixel with the white pixel data for the pixel immediately above and below the selected pixel. The logical inverse of this white column data is then stored in memory area 14.

FIG. 5 illustrates the fifth, sixth and seventh memory areas 15, 16 and 17 respectively. The fifth memory area 15 stores data that is the logical inverse of the data stored in row "n" of the second memory area; that is, the inverse of the white pixel data for row "n". This inverted white pixel data is then shifted right one bit and stored in the sixth memory area 16. Similarly, the inverted white pixel data is shifted left one pixel and stored in the seventh memory area 17.

FIG. 6 illustrates the eighth memory area 18 in which a logical "0" indicates that the corresponding pixel is a white pixel surrounded, on all four side, by four other white pixels. Conversely, a logical "1" indicates that the corresponding pixel is either not white, or one of the surrounding pixels is not a white pixel. This result is obtained by logically OR'ing the corresponding pixels in the fourth, sixth and seventh memory areas.

FIG. 7 illustrates the ninth memory area 19 in which the original color data from row "n" of the first memory area is stored.

FIG. 8 illustrates the tenth memory area 20 wherein an intermediate color image is stored. This intermediate color is similar to the original color image of the first memory area, except that interior white pixels have been converted to black. This result is accomplished by logically AND'ing each primary color of each pixel of the ninth memory area (which contains a portion of the original color image) with the corresponding pixel of the eighth memory area (wherein a "0" bit indicates that the corresponding pixel is an interior white pixel).

FIG. 9 illustrates the eleventh memory area 21 which includes four sub-areas. In the first sub-area, a logical "1" indicates that the corresponding pixel is a "white outline pixel." A white outline pixel is a white pixel that is not surrounded by four other white pixels, i.e., a white pixel that is not an interior white pixel. This result is achieved by AND'ing each of the three primary colors for each pixel of the tenth memory area. Since the tenth memory area contains the color image in which interior white pixels have been converted to black, the only remaining white pixels must be white outline pixels.

In the second sub-area, a logical "0" indicates that the corresponding pixel is either an original interior white pixel (which has been converted to a black pixel in the tenth memory area) or an original black pixel. This result is obtained by logically OR'ing the three primary colors in the tenth memory area. This result in then inverted and stored in the third sub-area such that a logical "1" in the third sub-area indicates that the corresponding pixel is either an original white interior pixel or an original black pixel.

To obtain the data for the fourth sub-area of the eleventh memory area, the first and third sub-areas are logically OR'ed. Thus, a logical "1" in this fourth sub-area indicates that the corresponding pixel is either an original white pixel (either interior or outline) or an original black pixel.

Figure 12:
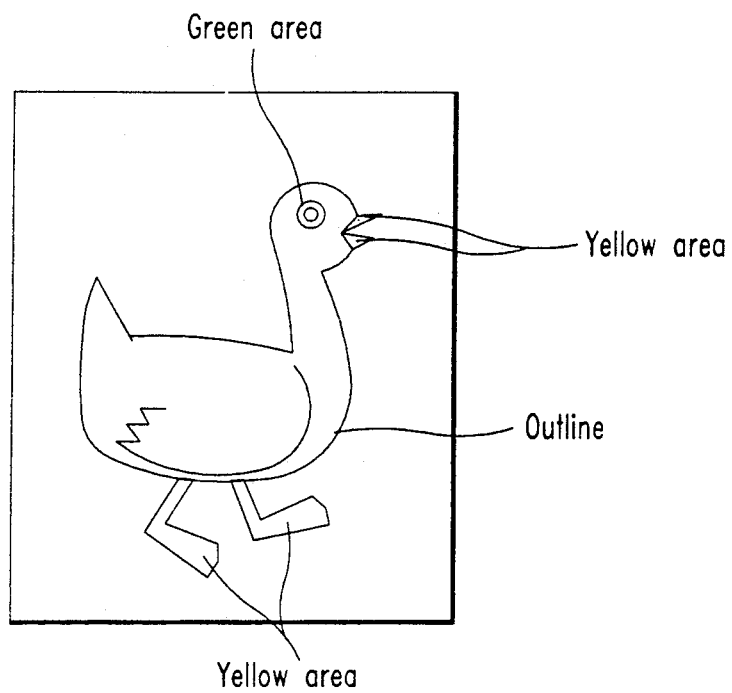
FIG. 12 illustrates how the image of FIG. 13 appears when it is printed using the apparatus and method of the present invention.
Figure 13:
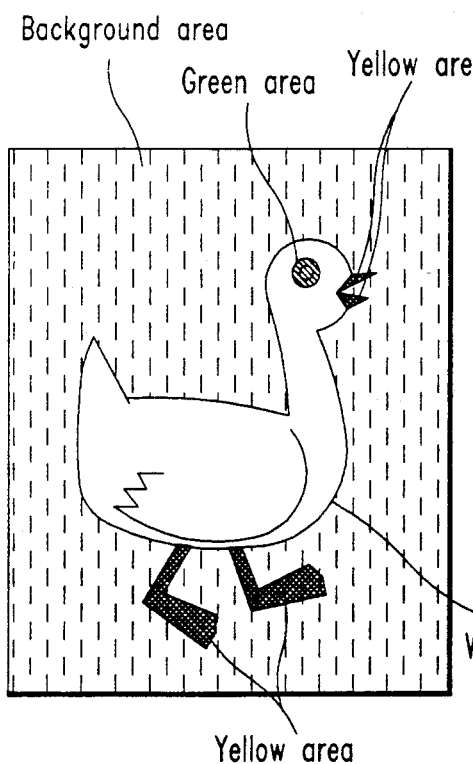
FIG. 13 illustrates an image as it appears on a color display screen.
Figure 14:
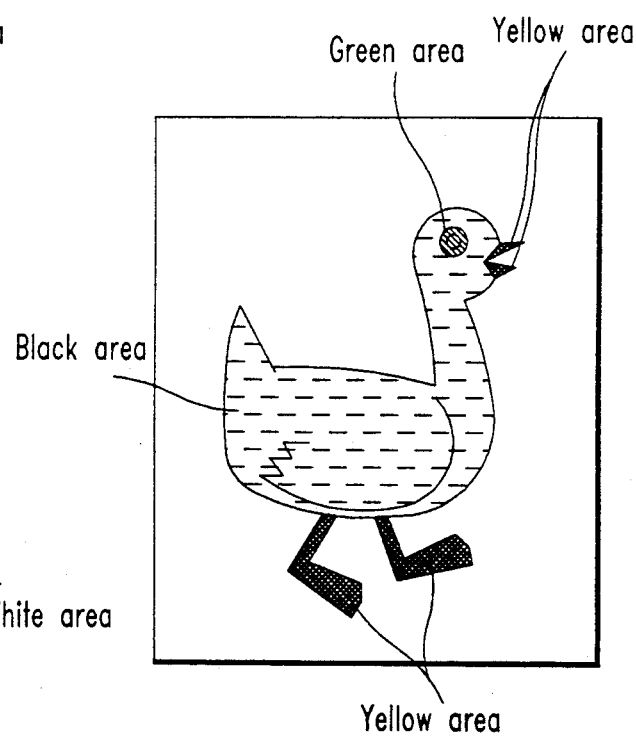
FIG. 14 illustrates how the image of FIG. 13 appears on a prior art printing apparatus.

FIG. 10 illustrates the twelfth memory area in which the final color image is stored. This final color image is obtained by exclusive OR'ing (XOR) each pixel of the intermediate color image as stored in the tenth memory area, with the corresponding pixel of the fourth sub-area of the eleventh memory area. Thus, if a logical "0" is encounterd in the fourth sub-area, indicating that the corresponding pixel is neither black nor white, the primary color data of the original color image is simply copied into the corresponding location of the twelfth memory area. Conversely, if a logical "1" is encountered in the fourth sub-area, indicating that the corresponding pixel is either originally white or black, the corresponding primary colors in the intermediate color image are inverted. This inversion causes original white interior pixels (which are black in the intermediate color image) to be inverted a second time and return to their original white color. Conversely, this inversion causes original white outline pixels (which were not changed in the intermediate color image) to be inverted to black. Consequently, white interior pixels remain white, while white outline pixels are converted to black. In addition, original black areas (which were not changed in the intermediate color image of the tenth memory area) are inverted to white. The final color image, as stored in the twelfth memory area, is then transferred to a buffer 23 and then on to converter 8 and printer 9. FIG. 12 shows the result of a print-out of the display screen image of FIG. 13, while FIG. 14 shows a prior art print-out in which white areas are simply converted to black.

We claim as our invention:

1. An image processor, comprising in combination:
    means for storing an original color image, said original color image comprising a multiplicity of pixels, some pixels having a first color and others having a second color;
    means for identifying a first group of pixels, said first group comprising the pixels in said original color image that are interior first color pixels, wherein an interior first color pixel is a first color pixel that is surrounded by other first color pixels;
    means for converting said original color image to an intermediate color image, wherein the first group of pixels in said original color image are converted to second color pixels in said intermediate color image;
    means for identifying a second group of pixels, said second group comprising the pixels in said original color image that are first color pixels;
    means for converting said intermediate color image to a final color image, wherein the pixels in said intermediate color image are converted such that first color pixels are converted to the second color and second color pixels are converted to the first color.

2. The image processor of claim 1, wherein said second group of pixels also includes the pixels in said original color image that are second color pixels, such that second color pixels in said original color image are converted to first color pixels in said final color image.

3. The image processor of claim 1, wherein said pixels are arranged in a multiplicity of rows, and wherein said means for identifying a first group of pixels includes:
    first means for comparing a first pixel in a first pixel row with a second and a third pixel, and for storing the result in a first memory area, said second pixel being positioned immediately above said first pixel, and said third pixel being positioned immediately below said first pixel;
    means for shifting a group of pixels in said first pixel row one pixel to the left, and for storing the result in a second memory area;
    means for shifting said group of pixels in said first row one pixel to the right, and for storing the result in a third memory area; and
    means for comparing said first, second and third memory area, such that an indication is stored in a fourth memory area if the second and third pixels, as well as the pixels immediately to the left and the right of the first pixel are all first color pixels.

4. The image processor of claim 3, wherein said means for converting said original color image to a intermediate color image includes a logical operation between each pixel of said original color image and said fourth memory area, such that interior first color pixels in said original image are converted to second color pixels in said intermediate color image.

5. A computer for use with a video display and a printer, said computer comprising in combination:
    a microprocessor unit;
    a memory;
    a video display adapter for driving a video display;
    a printer adapter for driving a printer;
    means for storing an original color image, said original color image comprising a multiplicity of pixels, some pixels having a first color and other having a second color, said original color image for display on a video display;

means for identifying a first group of pixels, said first group comprising the pixels in said original color image that are interior first color pixels, wherein an interior first color pixel is a first color pixel that is surrounded by other first color pixels;

means for converting said original color image to an intermediate color image, wherein the first group of pixels in said original color image are converted to second color pixels in said intermediate color image;

means for identifying a second group of pixels, said second group comprising the pixels in said original color image that are first color pixels;

means for converting said intermediate color image to a final color image, wherein the pixels in said intermediate color image are converted such that first color pixels are converted to the second color and second color pixels are converted to the first color, said final color image for printing on a printer.

6. The computer of claim 5, wherein said second group of pixels also includes the pixels in said original color image that are second color pixels, such that second color pixels in said original color image are converted to first color pixels in said final color image.

7. The computer of claim 5, wherein said pixels are arranged in a multiplicity of rows, and wherein said means for identifying a first group of pixels includes:

first means for comparing a first pixel in a first pixel row with a second and a third pixel, and for storing the result in a first memory area, said second pixel being positioned immediately above said first pixel, and said third pixel being positioned immediately below said first pixel;

means for shifting a group of pixels in said first pixel row one pixel to the left, and for storing the result in a second memory area;

means for shifting said group of pixels in said first row one pixel to the right, and for storing the result in a third memory area; and means for comparing said first, second and third memory areas, such that an indication is stored in a fourth memory area if the second and third pixels, as well as the pixels immediately to the left and the right of the first pixel are all first color pixels.

8. The computer of claim 7, wherein said means for converting said original color image to a intermediate color image includes a logical operation between each pixel of said original color image and said fourth memory area, such that interior first color pixels in said original image are converted to second color pixels in said intermediate color image.

* * * * *